Sept. 30, 1947.     H. MAXWELL     2,428,236
DYNAMO-ELECTRIC MACHINE
Original Filed May 28, 1943
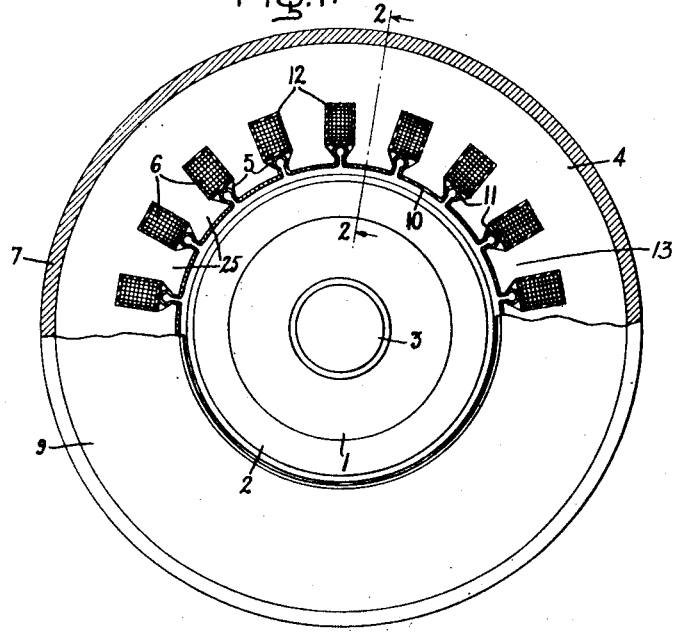
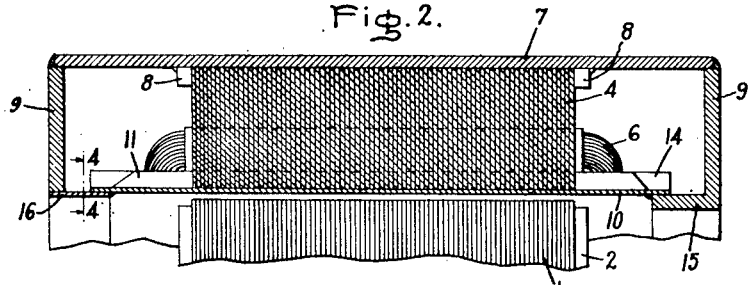
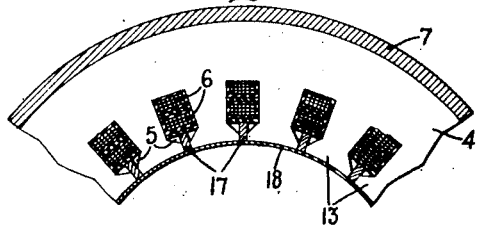
Inventor:
Howard Maxwell,
by Prowell S. Mack
His Attorney.

Patented Sept. 30, 1947

2,428,236

UNITED STATES PATENT OFFICE 2,428,236

DYNAMOELECTRIC MACHINE

Howard Maxwell, Schenectady, N. Y., assignor to General Electric Company, a corporation of New York Original application May 28, 1943, Serial No. 488,863. Divided and this application August 7, 1945, Serial No. 609,458

4 Claims. (Cl. 171—252)

1

My invention relates to dynamoelectric machines and particularly to such machines wherein it is desirable to enclose the stator core and winding separately from the rotatable member of the machine.

This application is a division of my application, Serial No. 488,863, filed May 28, 1943, and assigned to the assignee of this application.

An object of my invention is to provide an improved dynamoelectric machine with an enclosed stationary member.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is an end view partly broken away, showing an embodiment of my invention; Fig. 2 is a sectional side view taken along line 2—2 of Fig. 1; Fig. 3 is a sectional partial end view of a further embodiment of my improved dynamoelectric machine construction, and Fig. 4 is a fragmentary view taken along line 4—4 of Fig. 2.

Referring to the drawing, I have shown a dynamoelectric machine which is adapted to be used in locations where the medium which surrounds the machine may be injurious to either or both the stator core and winding if it is permitted to come in contact therewith. The machine illustrated is an induction motor provided with a conventional laminated rotor core 1 having a squirrel cage winding 2 therein and supported on a shaft 3. The stationary member of the machine is provided with a core 4 formed of laminations of magnetic material having winding slots 5 formed therein in which a winding 6 is arranged. The stationary member core 4 is mounted in a shell or frame 7 arranged about the outer side of the laminations and is held in position in the frame 7 by a pair of retaining end rings 8 arranged in engagement with the outer laminations of the core and secured to the frame 7 in any suitable manner, as by welding. The laminations of the stationary member core 4 and the winding 6 are arranged within an enclosure which includes end plates 9 secured to the stator frame or shell 7 and provided with a relatively thin tubular member 10, preferably of material having a relatively high resistance, which extends between the end plates 9 and is secured thereto in any suitable manner to form a fluid-tight joint

2 therewith, so that the laminations and the winding 6 are enclosed in a substantially fluid-tight housing. The tubular member 10 is formed with a plurality of longitudinally or axially extending circumferentially spaced apart integrally formed corrugations 11 on the outer side thereof. These corrugations 11 are formed with slightly larger outer portions than the inner portions near the tubular member 10 and extend outwardly into the narrow open ends of the winding slots 5 in the core and in the illustrated construction extend into contact with slot insulation 12 about the winding 6. This provides for retaining the winding and slot insulation in position and assures locking the tubular member 10 securely to the laminated core 4 and in good thermal contact with the ends of teeth 13 to provide for good interchange of heat therebetween. The outer end portions 14 of the corrugations 11 are shown closed together as by pressing and secured together and to end plates 9 by a fluid tight seal in any suitable manner, as by welding, or brazing. These ends 14 may be secured directly to the end plate as to a flange 15 thereof or to a thin cylinder 16 secured to the end plate 9 to form a fluid-tight enclosure with the shell 7 about the winding 6 and the core 4. This construction provides a compact and reinforced air-gap enclosure.

Fig. 3 illustrates a further embodiment of my invention, wherein axially extending circumferentially spaced apart, projections are formed as ribs 17 welded, brazed, or otherwise suitably secured to an inner tubular or cylindrical member 18. These ribs 17 extend within the outer open ends of winding slots 5 in the core 4 and into good thermal contact with the adjacent ends of the teeth 13. The ends of the enclosing tubular member 18 are secured to the shell end plates 9 by suitable fluid-tight joints such as those shown in Fig. 2 and provide substantially the same advantages of that construction and is made of simple structural elements. The projecting ribs 17 might also be made with larger and tapered wedge-shaped outer portions to lock the inner member 18 to the core 4 as in Fig. 1.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamoelectric machine including a rotatable member and a stationary member having a core formed of laminations with winding slots therein, a winding in said winding slots, an enclosure extending about a portion of said core and said winding including a relatively thin tubular member extending between said core and said rotatable member, and means including projections on said tubular member extending axially and outwardly into said core for transferring heat between said tubular member and said laminations and for retaining said winding in said winding slots.

2. A dynamoelectric machine including a rotatable member and a stationary member having a core formed of laminations with winding slots therein, a winding in said winding slots, an enclosure extending about a portion of said core and said winding including a relatively thin member extending between said core and said rotatable member arranged substantially in engagement with the inner surface of said core, and means including axially extending projections arranged in circumferentially spaced apart relationship on said tubular member extending into said core for retaining said winding in said winding slots and for transferring heat between said tubular member and said laminations, said projections being formed with wider outer portions for locking said tubular member to said core.

3. A dynamoelectric machine including a rotatable member and a stationary member having a core formed of laminations with winding slots therein, a winding in said winding slots, an enclosure extending about a portion of said core and said winding including a relatively thin tubular member extending between said core and said rotatable member, and means including axially extending projections formed as corrugations on said tubular member extending outwardly into slots in said core for stiffening said tubular member and for retaining said winding in said winding slots and for transferring heat between said tubular member and said laminations, said projections being formed with wider outer portions for locking said tubular member to said core.

4. A dynamoelectric machine including a rotatable member and a stationary member having a core formed of laminations with winding slots therein, a winding in said winding slots, an enclosure extending about a portion of said core and said winding including a tubular member extending between said core and said rotatable member, and means including axially extending projections on said tubular member extending in circumferentially spaced apart relationship into said core by way of said winding slots for retaining said winding in said winding slots and for transferring heat between said tubular member and said laminations, said projections extending from the outer side of said tubular member substantially into engagement with elements of said winding.

HOWARD MAXWELL.

REFERENCES CITED

The following references are of record in the file of this patent:

UNITED STATES PATENTS

| Number | Name | Date |
| --- | --- | --- |
| 1,269,909 | Cooper | June 18, 1918 |
| 1,974,183 | Gunderson | Sept. 18, 1934 |
| 2,128,544 | Surjaninoff | Aug. 30, 1938 |